S. W. WARDWELL, Jr.
Shaft Bearing.
No. 220,198. Patented Sept. 30, 1879.
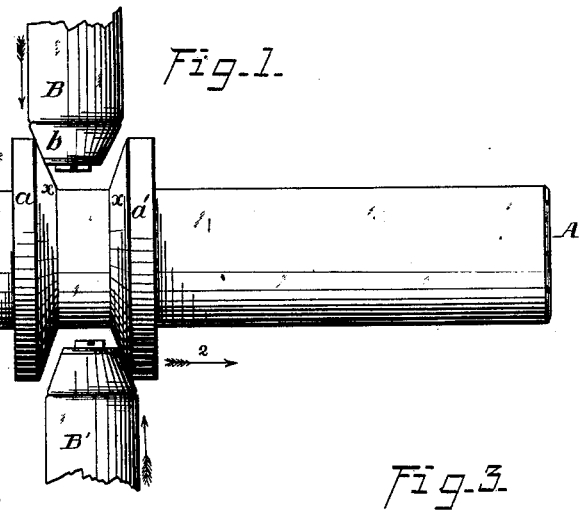
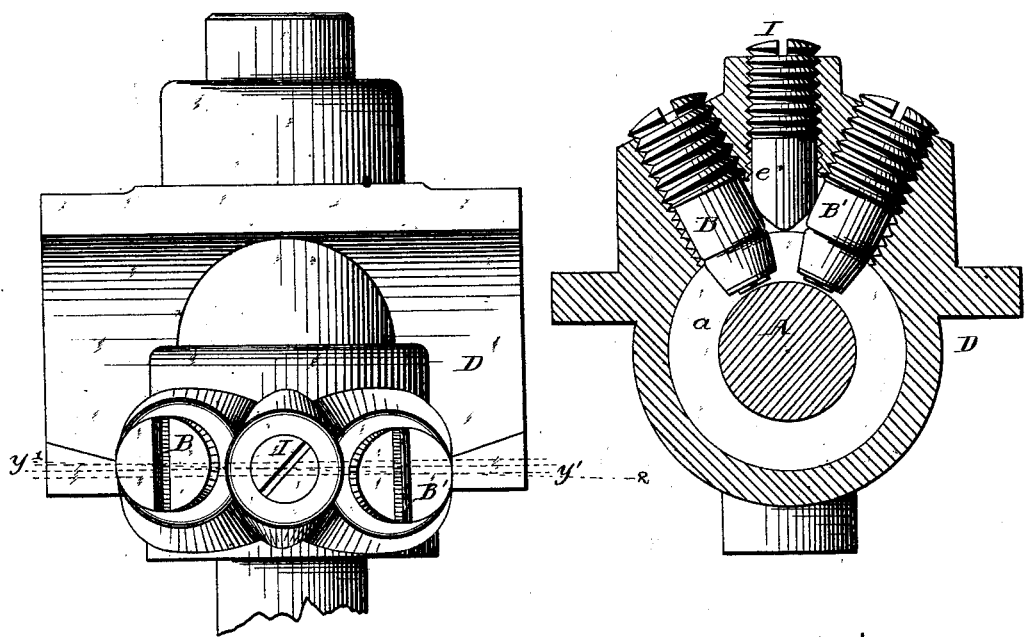
WITNESSES:
Jas. E. Hutchinson
Courtney A. Cooper
INVENTOR.
Simon W. Wardwell Jr.
By his attorney
Charles E. Foster

UNITED STATES PATENT OFFICE.

SIMON W. WARDWELL, JR., OF PROVIDENCE, RHODE ISLAND, ASSIGNOR TO HAUTIN SEWING MACHINE COMPANY.

IMPROVEMENT IN SHAFT-BEARINGS.

Specification forming part of Letters Patent No. 220,198, dated September 30, 1879; application filed March 17, 1879.

*To all whom it may concern:*

Be it known that I, SIMON W. WARDWELL, Jr., of Providence, Providence county, State of Rhode Island, have invented an Improved Shaft-Bearing, of which the following is the specification.

The object of my invention is an adjustable bearing for shafts, constructed as fully described hereinafter, whereby an exact longitudinal adjustment of the shaft may be secured, and an anti-friction bearing against "end-thrust" is afforded.

In the drawings forming part of this specification, Figure 1 is a diagram illustrating my invention. Fig. 2 is a plan view illustrating a shaft and its bearings; and Fig. 3, a section, vertically, on the line 1 2, Fig. 2.

In Fig. 1, A represents a portion of a shaft revolving in suitable bearings, and provided with two flanges or collars, $a$ $a'$, having beveled inner faces $x$. B B' are studs, adjustable radially in respect to said shaft, and each carrying a conical friction-roller, $b$, corresponding in taper with the side of the adjacent face $x$, the stud B being nearest the collar $a$, and the stud B' nearest the collar $a'$. Each stud is movable longitudinally and capable of being secured after adjustment.

If it is desired to adjust a light shaft in the direction of the arrow 1, the stud B' is withdrawn and the stud B moved inward, when the inclined face of the friction-roller $b$, acting on the inclined face of the collar $a$, will carry the shaft to the left. A movement in the direction of the arrow 2 is effected by reversing these operations, the stud B' being moved inward and the stud B outward. The studs B B', however, are not depended upon as a means for moving the shaft longitudinally, as heavy shafts must be first set in position and then secured by adjusting the studs.

By this means the position of the shaft may be varied with the utmost nicety, and the shaft reset to compensate for the slightest wear, while an almost frictionless longitudinal bearing in either direction is afforded.

It will be apparent that a like result may be obtained by placing the studs on opposite sides of a single flange or collar having two beveled faces, or by using collars with faces at right angles to the shaft, and adjusting the studs on lines inclined in respect to said faces.

A practical embodiment of my invention is illustrated in Figs. 2 and 3, in which D is the shaft-bearing, recessed to receive the collars $a$ $a'$, and with radial threaded openings adapted to the threaded studs B B', the centers of the two openings being upon different parallel planes, (represented by the dotted lines $y$ $y'$.) To a threaded opening midway between the studs B B' is adapted a threaded stud, I, carrying at the lower end a freely-turning flat-sided wedge-block, $e$, which may be forced between and against both studs B B' after adjustment, so as to retain them in position.

It will be apparent that bearing-blocks may be substituted for the friction-rollers $b$.

I claim—

1. The combination of a flanged shaft and two adjustable studs, B B', arranged in respect to the shaft and operating to retain the same longitudinally in the different positions to which it may be adjusted, substantially as set forth.

2. The combination of the shaft, one or more bevel-sided flanges or collars, and radially-adjustable studs B B', carrying friction-rollers $b$, substantially as set forth.

3. The combination, with the adjustable studs B B', of the adjustable wedge $e$, as set forth.

In testimony whereof I have signed my name to this specification in the presence of two subscribing witnesses.

SIMON W. WARDWELL, JR.

Witnesses:
NELSON P. EDDY,
FRED H. BISHOP.